United States Patent [19]
Thompson

[11] Patent Number: 5,301,357
[45] Date of Patent: Apr. 5, 1994

[54] METHOD AND SYSTEM FOR HANDLING IMPROPER REGISTRATIONS

[75] Inventor: Michael J. Thompson, Davie, Fla.

[73] Assignee: Motorola, Inc., Schaumburg, Ill.

[21] Appl. No.: 741,018

[22] Filed: Aug. 6, 1991

[51] Int. Cl.⁵ ............................................. H04B 7/00
[52] U.S. Cl. .................................. 455/33.4; 455/54.1; 379/59
[58] Field of Search ................... 455/33.1, 33.2, 33.4, 455/34.1, 54.1, 56.1; 379/58, 59, 60

[56] References Cited
U.S. PATENT DOCUMENTS

| | | | |
|---|---|---|---|
| 4,144,409 | 3/1979 | Utano et al. | 455/33.4 |
| 4,876,738 | 10/1989 | Selby | 455/56.1 |
| 4,905,301 | 2/1990 | Krolopp et al. | 455/33.4 |

OTHER PUBLICATIONS

"Basic 800 MHz Trunked Radio Systems" Product Digest, Motorola Manual R4-1-84C, no publication date found.

Primary Examiner—Reinhard J. Eisenzopf
Assistant Examiner—Edward Urban
Attorney, Agent, or Firm—Pedro P. Hernandez

[57] ABSTRACT

A system and method for providing automatic system deregistration for any incorrectly registered radios is described. The system and method further provides for an automatic re-registration request to be sent in order to guarantee that any valid radios that have the same radio identification information in the system as the incorrectly registered radio to become re-registered. By requesting any radio having the same ID to re-register back with the system, a loss of communication to that radio is thereby prevented.

11 Claims, 4 Drawing Sheets

FIG.4
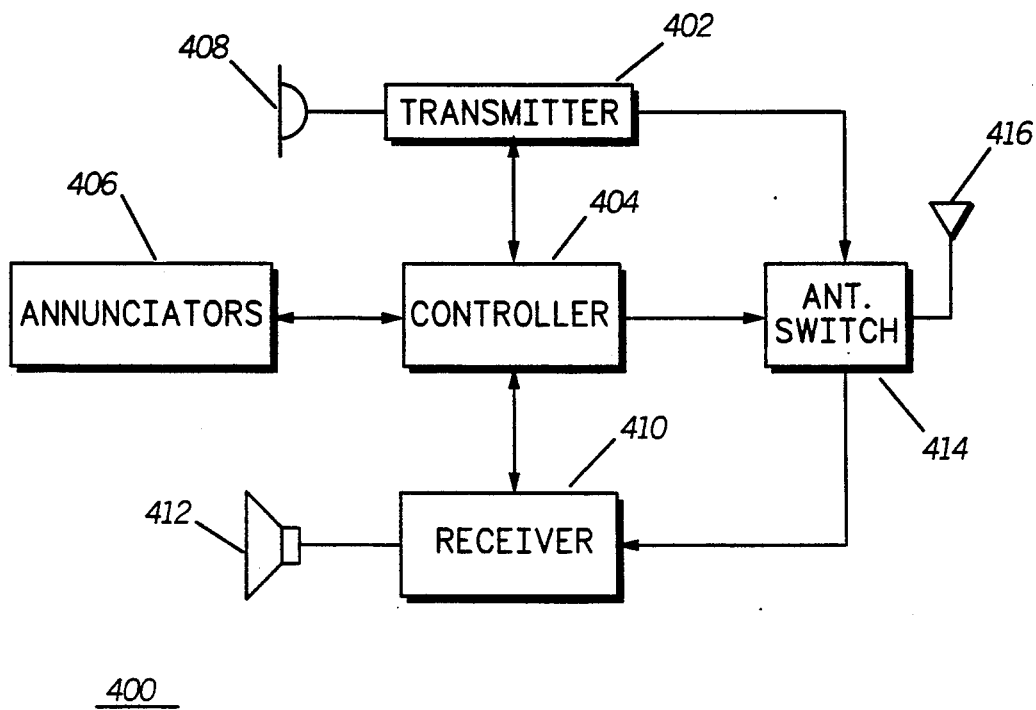
FIG.5
SIGNALLING FORMATS:
DEREGISTRATION ISW
RE-REGISTRATION OSW

METHOD AND SYSTEM FOR HANDLING IMPROPER REGISTRATIONS

TECHNICAL FIELD

This invention relates generally to communication systems, and more specifically to radio communication systems.

BACKGROUND

In wide area trunked radio systems that utilize a feature such as Automatic Multiple Site Switching (hereinafter referred to as "AMSS") an entire area such as an entire state can belong to one system comprised of multiple sites. AMSS allows communications to be extended beyond the reach of a single trunked site (repeater antenna facility). AMSS automatically switches a radio to a different site when the current site signal becomes to weak, which is usually determined by measuring the received signal strength (RSS) level at the radio. Typically, this happens when the vehicle the radio is in is driven out of range of one site and into the range of another site.

Any subscriber radio sending in a channel request would be granted a channel on all sites simultaneously when any channel becomes available in the system, thus enabling the radio operator to maintain communication with his radio talkgroup throughout the wide area system. Though such systems provide communication throughout the entire wide area covered by the system, it also results in waisted channel allocation (lowers spectrum efficiency of the system) since all members of a particular talkgroup are generally confined to a relatively small number of sites within the overall system.

In communication systems such as cellular systems and more sophisticated trunking systems, all subscriber radios must "register" within the site that they are currently located in. This registration process informs the system controller of where each radio in a system is located (which specific site). Thus, when a channel request is received at the system controller, it can then identify which sites have to have a channel allocated for the transmission to occur. In a typical cellular system, only the site where the requesting unit is located and the site of the receiving unit have to have a channel allocated (in the case of a cellular to cellular call). In the case of a trunked system, only the sites where radios that belong to the same talkgroup have to be allocated a channel for communication to occur, thereby increasing the overall spectrum efficiency of the system(no need to allocate a channel at each site).

If a subscriber radio changes sites during a conversation, it is imperative that it register as quickly as possible on the new site, because if it is the only member of the active call's talkgroup (in the case of a trunked system) on that site, a channel will not be assigned for the call until the system is informed that a member of the talkgroup is now present on the site. Whenever a subscriber radio changes sites, it's registration on the new site automatically deregisters it on the old site.

However, if a radio is turned off, or is changed to a different system by the operator, the radio will deregister on the system, informing the system that this particular ID is no longer active on the system. If a deregistering radio is the only member of the talkgroup within the site it deregisters on, the system will drop any active call to that talkgroup on that site and will not assign a channel on that site for the active talkgroup until a member of the talkgroup again registers on that site. If somehow, a subscriber radio becomes active on a site as the only member of his talkgroup on that site and the system was for some reason not aware of this unit, or considered this unit to be registered to a different talkgroup, channels would not be assigned on that site for the radio's talkgroup and the radio would miss all talkgroup traffic until the situation was remedied.

In radio communication systems such as trunked radio communication systems that require rapid site registration, it is possible for a radio to register in a wrong system. This improper registration cannot be corrected with a normal "deregistration" sequence as used in the prior art, as this might deregister a valid radio presently on that system. This can occur if a radio on an adjoining system has the same unit ID information as the radio that registered incorrectly. Since radio communications systems are the backbone of communications for such groups of users as police officers, fireman and the like, it becomes very important, if not critical, that the above mentioned registration problems do not occur. A need exists in the art for a method and system for properly deregistering an incorrectly registered radio and at the same time re-registering any radios having the same "valid" radio ID back into the system.

SUMMARY OF THE INVENTION

Briefly described, the present invention contemplates a method and system for deregistering an incorrectly registered communication device and re-registering any valid communication devices having the same device identification information onto the system.

According to the invention the method comprises the steps of receiving a deregistration message from the communication device which incorrectly registered with the communication system and deregistering the incorrectly registered communication device from the communication system. Then requesting any communication device operating in the communication system which has the same device identification number as the communication device which incorrectly registered on the system to re-register with the communication system.

In another aspect of the present invention, a communication system capable of automatically deregistering an incorrectly registered communication device and re-registering any valid communication devices on the system with the same device identification number is described.

BRIEF DESCRIPTION OF THE DRAWINGS

In FIG. 4 a block diagram of a communication device in accordance with the present invention is shown.

In FIG. 5 a typical set of signalling formats used in accordance with the present invention is shown.

DETAILED DESCRIPTION OF THE PREFERRED EMBODIMENT

Figure 1:
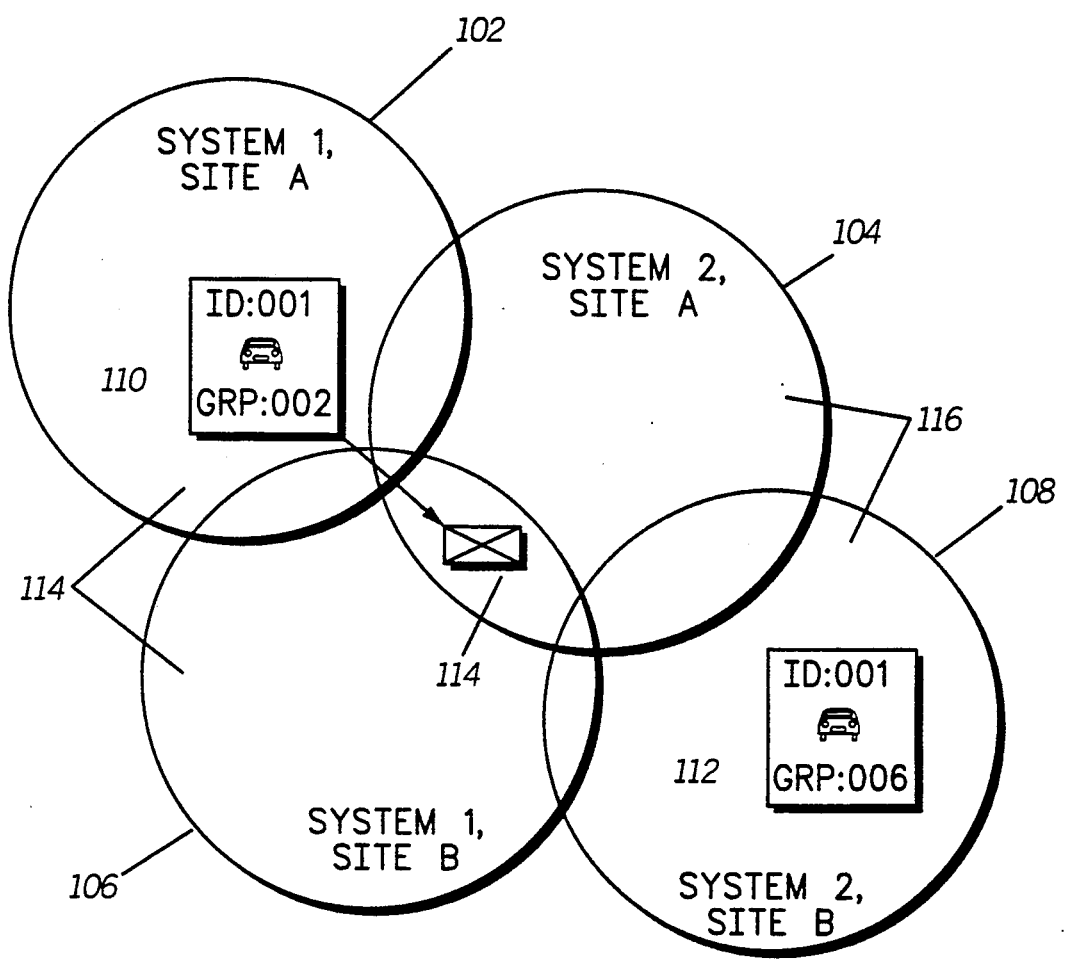
FIG. 1 shows a set of overlapping radio communication systems in accordance with the present invention.

Referring now to the drawings and specifically to FIG. 1, there is shown two overlapping communication systems. The first system 114 comprising a site "A" 102 and a site "B" 106, while the second system 116 comprises a site "A" 104 and a site "B" 108. Also shown in FIG. 1 is a subscriber radio unit 110 operating in system number one 114, site "A" 102 and a second subscriber radio unit 112 presently operating in system number two 116, site "B" 108. The present invention solves the problem that occurs when two communication systems that utilize subscriber site registration each have sites within range of a particular radio. For example, in FIG. 1 location 114 is in range of site 106, of system 114 (site "B", System 1) and site 104 of system 116 (site "A", System 2). Overlapping of sites usually occurs in congested urban areas where one tends to find overlapping systems due to their close geographic proximity. Each radio (110 and 112) in a communication system such as systems 114 and 116, have a unique individual radio identification information (ID number) assigned to the radios. For example, radio 110 which belongs to system 114 has a radio ID of "001" and a talkgroup ID of "002", while radio 112 which belongs to system 116 has the same radio ID of "001" and a group ID of "006". Here, each radio 110 and 112 has the same radio ID of "001", typically this would not present a problem since each radio operates in independent communication systems 114 and 116. When a radio registers on a site, this individual ID becomes associated with one or more groups of ID's (this is typically found in trunked radio system, where radios are associated with each other via talkgroups) or talkgroups.

A radio from one system, say system 114, which registers on a second system 116 might posses an individual radio unit ID valid for another radio in that system 116, such as is the case with radios 110 and 112. The act of radio 110 registering on the wrong system will cause system 116 to associate what would likely be a wrong group ID with the individual ID and could cause system 116 to register this individual and group on a site other than the actual site that the "valid" radio 112 is on. This situation can cause loss of communication for radio 112 and confusion in system 116 as to which site radio 112 is really in.

Because each system 114 and 116 also has a unique system ID that is periodically sent to all radios 110 and 112 on each of the systems 114 and 116, a radio 110 registering on the wrong system 116 will eventually see a wrong ID from the system (sent by the system controller) and would then search again for its the valid system (the radio would begin to scan for the correct system). However, it is at this point imperative that the invalid registration that occurred in system 116 be corrected. A typical prior art deaffiliation routine would not accomplish this since it would leave the system with information indicating that a radio with this radio's particular ID "001" (radio 112) no longer exists on the system 116, whereas there might actually be one (in the case presented in FIG. 1, radio 112 would be deleted under the prior art approach, since it has the same radio ID of "001").

The present invention corrects the above problems by informing system 116 that improper registration information exists for a particular ID (ID:001) before the radio unit 110 leaves the system 116. System 116 would then automatically respond to this new deaffiliation with a request for re-registration for this particular ID on all sites 104 and 108, in system 116. The valid radio, in this case radio 112, which has the identical ID would then inform the system 116 of its registration information, which would include both site and group ID's, thereby guaranteeing that communications addressed to radio 112 can continue uninterrupted after radio 110 has deregistered.

Figure 2:
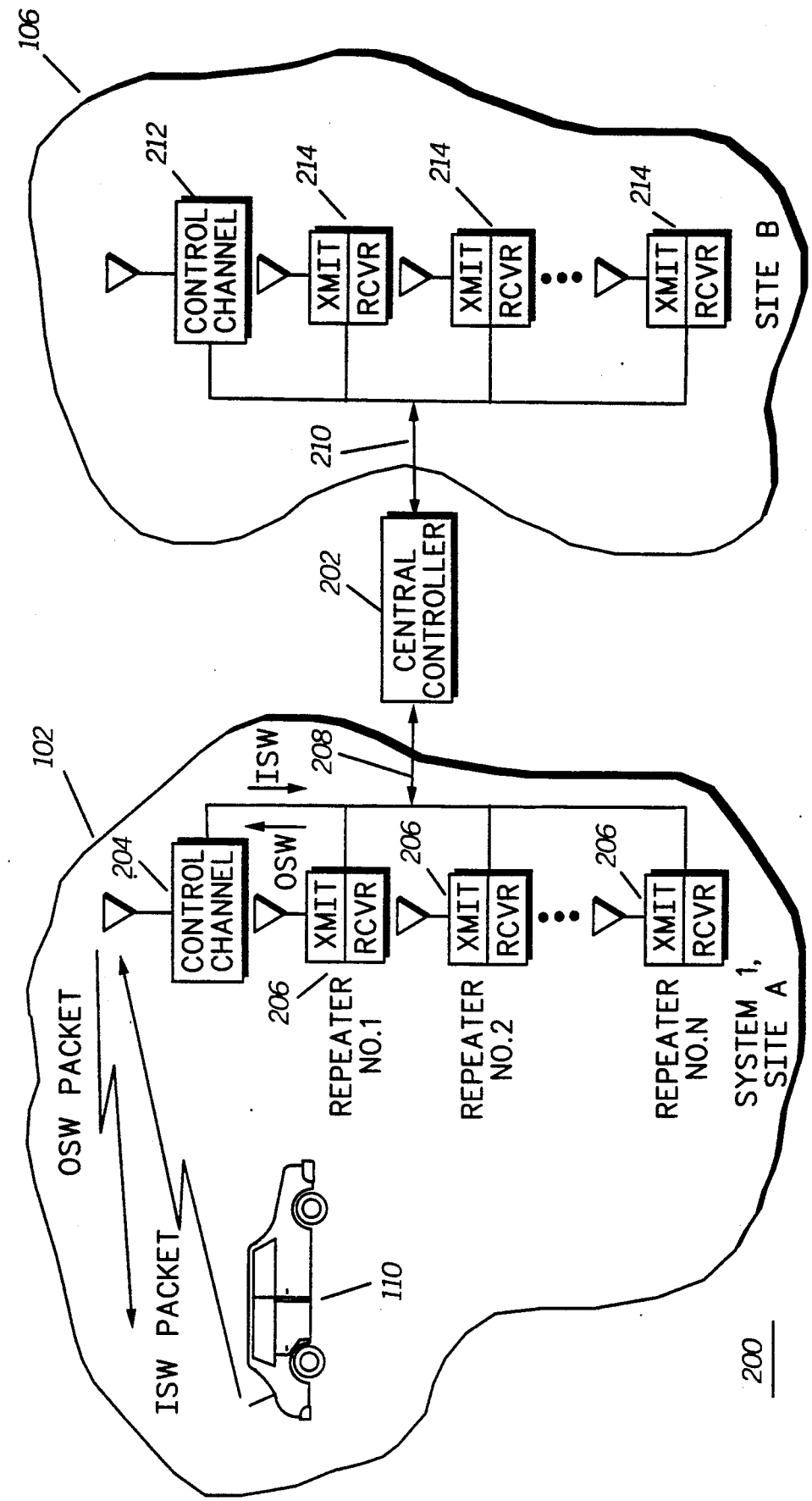
In FIG. 2 a block diagram of a radio communication system in accordance with the present invention is shown.

In FIG. 2, a block diagram of a typical trunked communication system such as system 114 of FIG. 1 is shown. Communication system 200 can be a trunked system utilizing subscriber unit registration as known in the art. Trunked radio system 200 consists of a control system or control means which is commonly referred to as a system central controller 202 which controls the assignment of voice channels (repeaters) 206 to different groups of communication devices, such as radio 110. Central controller 202 is basically a computerized control station which controls the overall operation of each of the sites that comprises the overall system 200. Central controller 202 is coupled via buses 208 and 210 to each of the system sites 102 and 106 respectively. Busses 208 and 210 allow for the sharing of control and audio information between central controller 202 and the individual system repeaters 204, 206, 212 and 214. Central controller 202 has appropriate management software for controlling all communication devices (such as subscriber radio 110) which are a part of trunked system 200. To better understand system 200, an example of the sequence of events for a standard radio group call will be described.

When one of the radios 110 (e.g. in radio group 002) that is in system 200 presses the push-to-talk switch (PTT in mobile 106), a burst of data is transmitted by radio 110 to the central controller 202 via the site control channel 204. The data sent is normally referred to as an inbound signalling word or ISW, which in this case constitutes a request for a voice channel. Preferably, any of the repeaters 206 except the one acting as the control channel 204 can be a voice/data channel 206. The central controller 202 upon reception of the ISW via bus 208 reviews the status of all the repeaters 206 and assigns an unused repeater 206 in site 102 by sending an information signal, or as it is more commonly referred to, an outbound signalling word (OSW) via the control channel 204 directing all radios in group "002" to a frequency corresponding to one of the repeaters 206 (i.e. repeater No. 1 or also known as channel No. 1). If any radios registered to talkgroup "002" are also located in site 106, a voice channel 214 is also allocated in site 106, in order to allow the radios in site 106 to also listen to the conversation.

The outbound signalling word (OSW) is received by all radios in site "A" 102, but only the radios in group "002" will be transferred to repeater No. 1 (206). Since the OSW contains information regarding which radios the information is for, the other radios in system 200 will continue to monitor their respective control channels 204 and 212 for OSWs, until they receive an OSW which is directed to them. The individual subscriber radio 110 which activated the PTT is now able to talk to any radio in his group over repeater No. 1 (206) and via all the other assigned voice channel repeaters in the other sites (e.g. site 106 could have one of it's voice channel repeater 214 assigned to this call if any radio in group "002" is presently registered in site 106. The linking of each of the voice channels 206 and 214 in the case radios in the same talkgroup are located in different sites 102 and 106, is accomplished by central controller 202. Central controller 202 will automatically link the voice channel audio paths to each other so that all radios in the talkgroup may listen to the transmission.

Other implementations of trunked radio systems for use with the current invention can include systems 100 which do not utilize a dedicated control channel 204 and 212 at each site, but use each of the channels 206 and 214 in the system to transmit the necessary system control information. This can be accomplished by utilizing imbedded signalling, which can be best accomplish in a system utilizing digital versus FM modulation. Other systems which can utilize the present invention can also include cellular telephone systems, non-trunked radio systems utilizing a base station and some form of data signalling such as MDC 1200 TM (a 1200 baud digital signalling scheme manufactured by Motorola, Inc.), and other related communication systems. A basic overview of the operation of a trunked radio system may be found in publication R4-1-84C entitled "Basic 800 MHz Trunked Radio Systems." This manual is available from the technical writing services department of Motorola, Inc., 1300 E. Algonquin Rd., Schaumburg Ill., 60196, and is incorporated by reference as if fully set forth herein.

Figure 3:
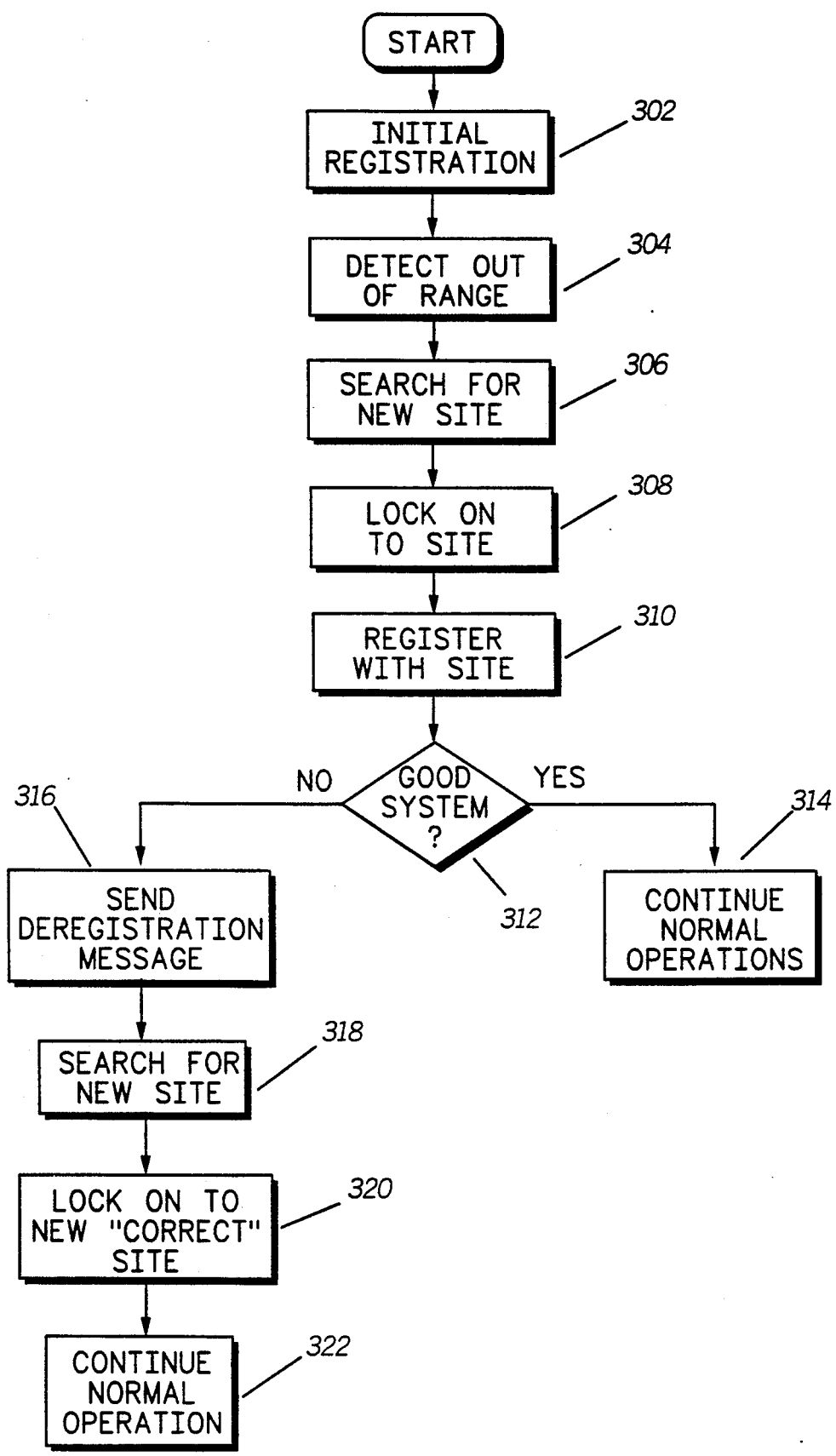
In FIG. 3 a flow diagram of a typical operation sequence in accordance with the present invention is shown.

In FIG. 3, a typical sequence for notifying a system of an improper registration in accordance with the present invention is shown. For this discussion, the systems and radios shown in FIG. 1 will be utilized. In step 302, a radio such as radio 110 (shown in FIG. 1) registers with a site (site "A" 102) in system 102. As the radio begins to move away from the coverage area of site 102 (radio 110 moves to location 114), radio 110 detects an "out of range" condition in step 304. This is typically accomplished by utilizing a relative signal strength measurement circuit such as those known in the art and found in radio 110. Once radio 110 detects that it has left site 102, it begins to search for a new site in step 306. This is accomplished by scanning a list of control channel frequencies stored in radio 110. In step 308, radio 110 "locks" on to a new site and registers with the new site in step 310. Unfortunately in this scenario, in step 312, radio 110 registers with site 104 of system 116, instead of site 106 of system 114, which is the correct site for system 114 (once radio 110 reaches location 114).

In step 316, after radio 110 has determined that it is in an incorrect system (radio 110 determines this after receiving the system ID information from system 116 which is transmitted periodically) it then transmits a system deregistration packet (ISW message) to system 116. This deregistration packet takes radio 110 out of system 116 and at the same time causes the central controller (not shown) of system 116 to request a re-registration from any radio in system 116 having the same ID number as radio 110 (the radio that deregistered), in this case ID: "001". Since in this particular case, radio 112 has the same ID ("001") as radio 110, therefore upon receiving the request to re-register (OSW) from central controller 202, radio 112 registers in on site 108, thereby causing no loss of communications to this "valid" radio. In step 318, radio 110 once again scans for a new "correct" site. Radio 110 is protected from choosing site 116 again incorrectly by a technique known in the art as "channel marking". Marking basically removes that channel (frequency) from the site list so that the radio does not once again choose the same incorrect site (basically marking temporarily deletes a scan list element from the scan list). In step 320, radio 110 "locks" on to the new correct site, which is site 106. Finally, in step 322 radio 110 proceeds with normal communications on system 114 (system 1). If in step 312 radio 110 determines that it is in a valid system, it will continue with normal operations in step 314.

In FIG. 4, a block diagram of a communication device such as a radio 400 (similar to radios 110 and 112) in accordance with the present invention is shown. Radio 400 consists of a conventional transmitter 402 and receiver 410, which are selectively coupled to antenna 416 via antenna switch 414. In the case of a full duplex radio such as a cellular radio, those skilled in the art will realize that they can replace the antenna switch 414 with a conventional duplexer. A speaker 412 is coupled to receiver 410 for the presentation of voice messages to the radio user. While a microphone 408 is coupled to transmitter 402 for the inputting of voice message that are to be transmitted.

Also part of radio 400 is a controller 404, which can take the form of a microprocessor or microcontroller having associated memory and I/O as known in the art. Controller 404 controls the overall operation of radio 400 including the automatic changing of frequencies for transmitter 402 and receiver 410. Also coupled to controller 404 is associated annunciators 406 such as a typical display, keypad, and controls as found in convention radios. Controller 404 is responsible for decoding all ISW's and encoding all OSW's sent through the system 200. ISW's such as the deregistration request from an incorrectly registered radio is decoded by controller 404. Upon decoding the ISW, controller 404 forms an OSW message which forces any radio in the system 300 which has the same radio identification number to re-register with the system.

In FIG. 5, a set of signalling formats for use with the present invention are shown. The deregistration ISW packet 502 is the information packet sent by the radio that incorrectly registered with the incorrect system. The deregistration message 502 consists of a requester ID field (radio identification information, "ID" of the radio that incorrectly registered) and a call type field requesting the deregistration of the radio from the system controller (deregistration request field). Also shown in FIG. 5 is a re-registration OSW 504 which is the information packet sent by the system central controller requesting any radio having the same radio ID (valid radio) to re-register with the system. The re-registration request 504 is sent by the system controller upon the incorrectly registered radio being deregistered by the system. Both deregistration ISW 502 and re-registration OSW 504 have the same bit size and structure as other OSW's and ISW's transmitted by the radio system, the only new information that have been added to these formats are new opcodes have been added to the system (deregistration and re-registration opcodes).

In summary, the present invention provides for a simple but yet very effective way of a radio registering in a wring system to deregister and at the same time notify the system of the incorrect registration, in order for the system to make sure that any radios having the same ID found on the system do not lose any important communications by forcing them to re-register with the system. In systems where communications are of a critical nature (e.g. police systems, etc.) the prevention of lost communications that the present invention provides is unmeasurable.

What is claimed is:

1. A method for deregistering a communication device which has incorrectly registered in a communication system, the communication system having a plurality of communication devices each having device identification information operating within the communication system, the plurality of communication devices having registered with the communication system, the method comprising the steps of:

determining at one of the plurality of communication devices that the communication device has incorrectly registered with the communication system:

receiving a deregistration message from the communication device which incorrectly registered with the communication system;

deregistering the incorrectly registered communication device from the communication system; and requesting that any from among the plurality of communication devices operating in the communication system which has the same device identification information as the communication device which incorrectly registered on the system to re-register with the communication system.

2. The method of claim 1, comprising the further step of:

preventing the communication device which incorrectly registered with the communication system to re-register with the communication system after the communication device has been deregistered from the communication system.

3. The method of claim 1, wherein the communication system is a trunked radio communication system and the communication devices are trunked radios.

4. The method of claim 1, wherein the communication system is cellular system and the communication devices are cellular telephones.

5. The method of claim 1, wherein the deregistration message sent by the incorrectly registered communication device includes the communication device's unique identification number and an information field informing the communication system of the incorrect registration.

6. The method of claim 5, wherein the step of requesting any communication device to re-register on the system is performed by a system controller.

7. A radio communication system for use by a plurality of radios, each of the radios having radio identification information and the plurality of radios have registered with the communication system, one from among the plurality of radios in the communication system is incorrectly registered with the communication system and has transmitted a deregistration message, the radio communication system comprising:

means for receiving the deregistration message sent from the radio that incorrectly registered with the radio communication system; and means for requesting that any from among the plurality of radios that belongs in the radio communication system and that has the same radio identification information as the radio that incorrectly registered with the radio communication system to re-register with the system.

8. The radio communication system of claim 7, wherein the radio communication system is a trunked radio communication system and the radios are trunked radios.

9. The radio communication system of claim 7, wherein the radio communication system is a cellular system and the radios are cellular telephones.

10. The radio communication system of claim 7, wherein the automatically requesting means comprises a system control means that transmits a re-register packet to all the radios in the radio communication system upon receiving the deregistration information from the incorrectly registered radio.

11. The radio communication system of claim 10, wherein the deregistration message sent by the incorrectly registered communication device includes the communication device's unique identification number and an information field informing the communication system of the incorrect registration.

* * * * *